United States Patent [19]

Wendt

[11] Patent Number: 4,631,652
[45] Date of Patent: Dec. 23, 1986

[54] FREQUENCY CONTROLLED RESONANT REGULATOR

[75] Inventor: Frank S. Wendt, Princeton, N.J.
[73] Assignee: RCA Corporation, Princeton, N.J.
[21] Appl. No.: 676,821
[22] Filed: Nov. 30, 1984
[51] Int. Cl.[4] .......................................... H02M 3/335
[52] U.S. Cl. ...................................... 363/16; 363/97; 363/56; 363/75
[58] Field of Search .................................. 363/16–26, 363/55–56, 75, 90, 97–98, 131–134

[56] References Cited

U.S. PATENT DOCUMENTS

| | | | |
|---|---|---|---|
| 3,818,314 | 6/1974 | Bishop et al. | 363/75 X |
| 4,007,413 | 2/1977 | Fisher et al. | 363/18 |
| 4,016,477 | 4/1977 | Ghiringhelli | 363/64 |
| 4,027,200 | 5/1977 | Sahara et al. | 363/20 X |
| 4,250,541 | 2/1981 | Chang et al. | 363/28 |
| 4,468,723 | 8/1984 | Hughes | 363/82 |

FOREIGN PATENT DOCUMENTS

| | | |
|---|---|---|
| 97884 | 1/1984 | European Pat. Off. |
| 108336 | 5/1984 | European Pat. Off. |
| 107003 | 5/1984 | European Pat. Off. |
| 1377777 | 12/1974 | United Kingdom |
| 1415316 | 11/1975 | United Kingdom |
| 1576552 | 10/1980 | United Kingdom |

OTHER PUBLICATIONS

"200 KHz Power FET Technology in OEM Modular Power Supplies", by P. Bailey et al, *Electronic Engineering*, Sep. 1981, pp. 39–49.
"200 kHz Power FET Technology in New Modular Power Supplies", R. Myers and D. Peck, "Hewlett-Packard Journal", Aug. 1981, pp. 3–10.

*Primary Examiner*—Peter S. Wong
*Attorney, Agent, or Firm*—Eugene M. Whitacre; Paul J. Rasmussen; Joseph J. Laks

[57] ABSTRACT

The primary winding of a high leakage inductance power tranformer is coupled to a source of unregulated voltage and to a square wave voltage generator that includes first and second alternately conducting output switching transistors. A voltage controlled oscillator establishes the operating frequency of the voltage generator. A resonating capacitor is coupled to a transformer secondary winding that is loosely coupled with the primary winding. The capacitor forms a series tuned circuit with the leakage inductance between the primary and secondary windings of the transformer. The operating point of the tuned circuit voltage verses frequency characteristic curve determines the amplitude of the generally sinusodial output voltage across the secondary winding, in accordance with the operating frequency of the square wave voltage generator. A feedback circuit senses the amplitude of the output voltage and varies the frequency of the voltage controlled oscillator to regulate the output voltage.

9 Claims, 8 Drawing Figures

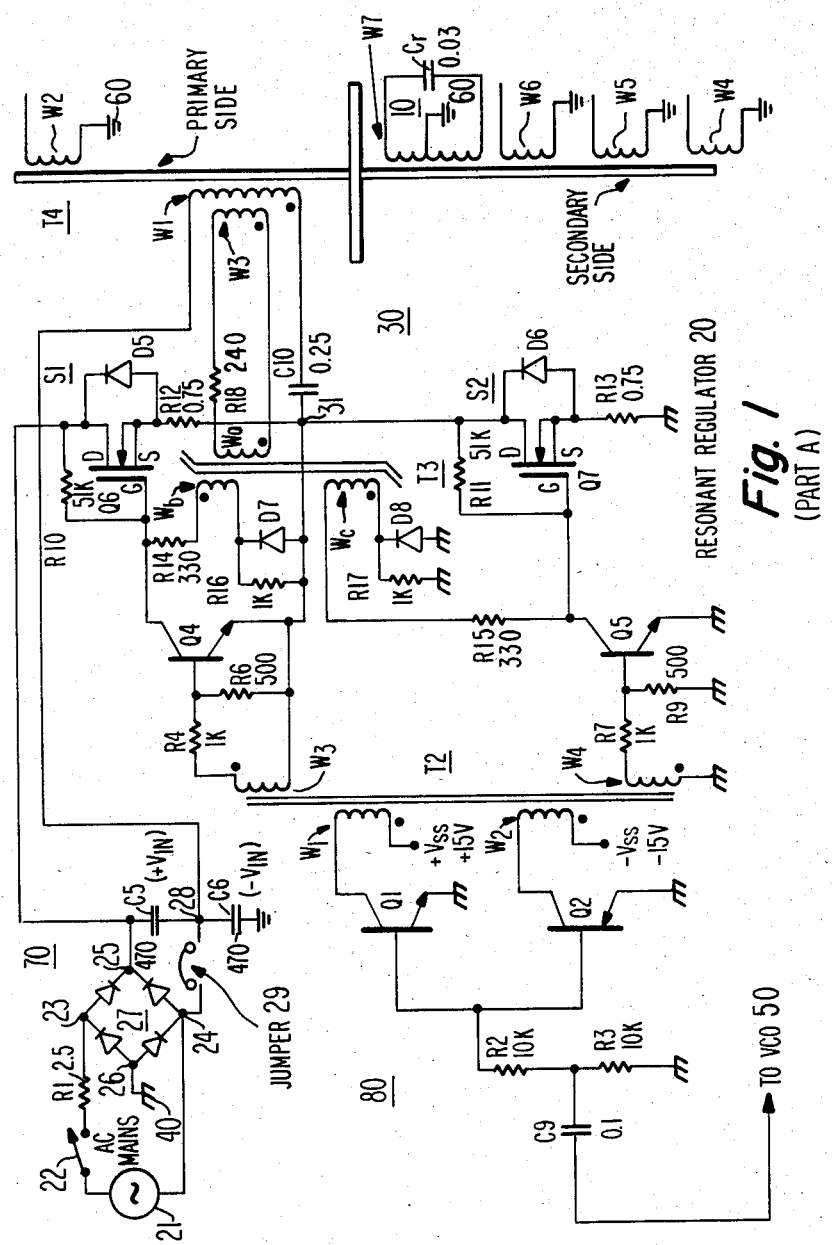
Fig. 1 (PART A)

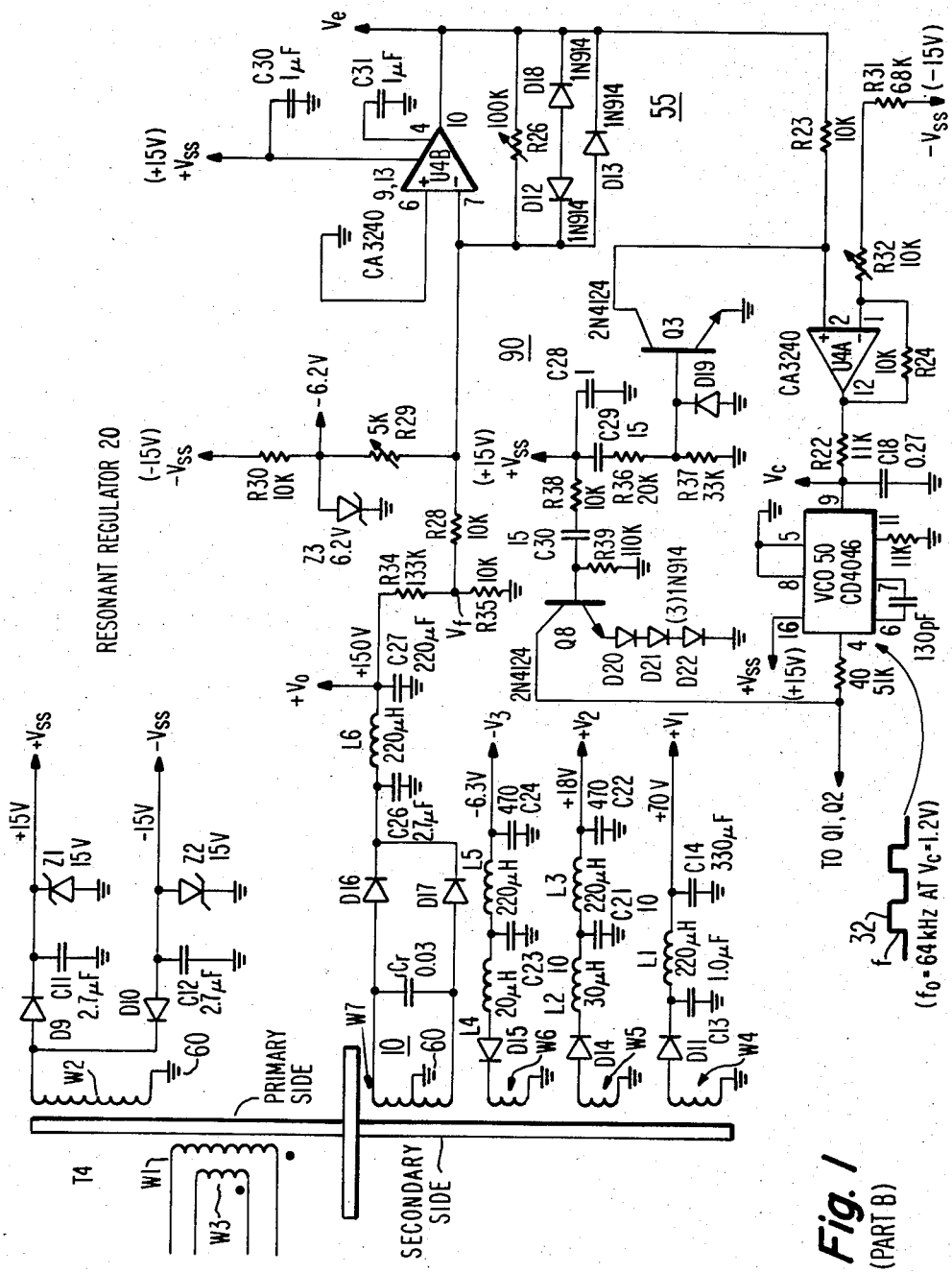
Fig. 1 (PART B)

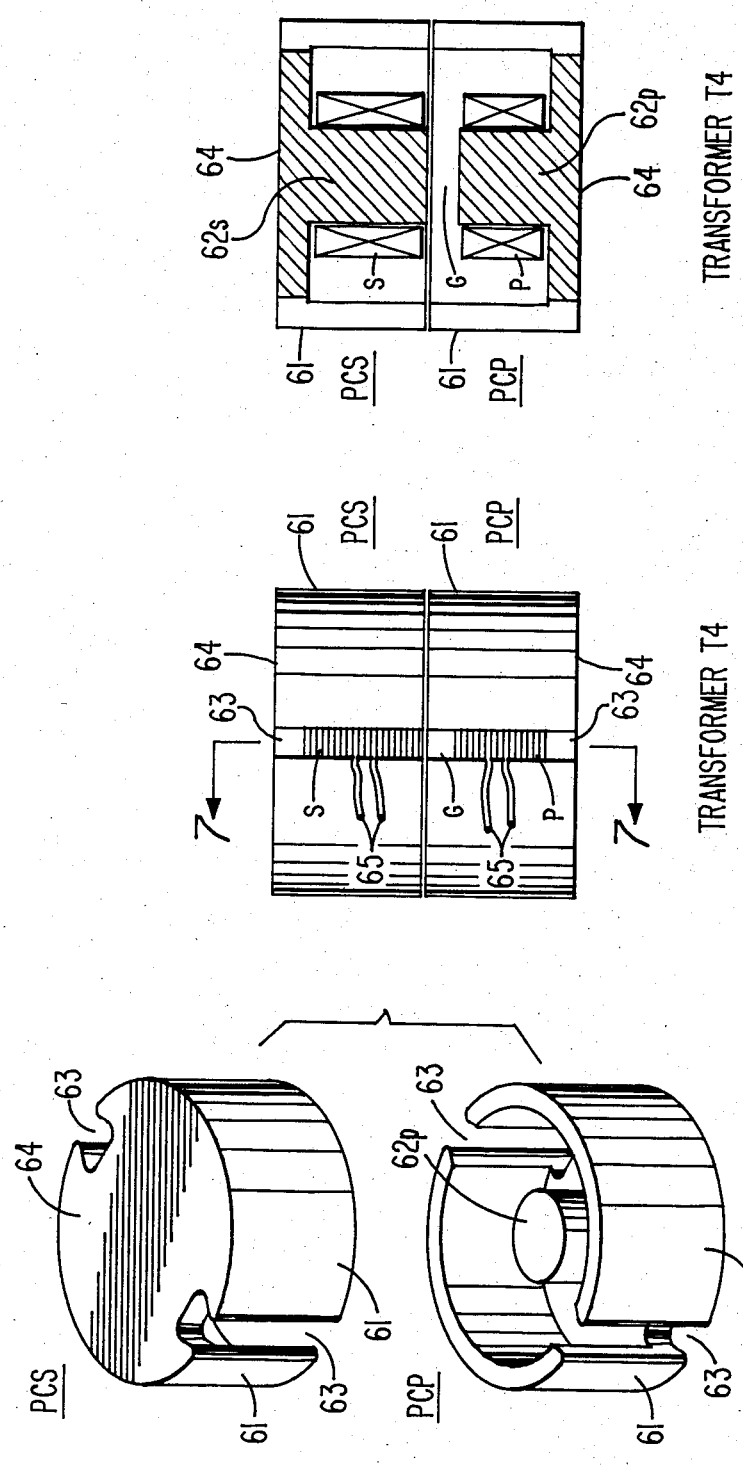

FREQUENCY CONTROLLED RESONANT REGULATOR

This invention relates to switching regulator power supplies.

Switched mode power supplies may be used to generate supply voltages from an unregulated input voltage. The power supply may include a switching stage coupled to the primary winding of a power transformer for generating output voltages across secondary windings of the transformer. To regulate the output voltages, it is known to pulse width modulate the switching stage of, for example, a flyback converter type of switched mode power supply.

It is desirable to operate a switching power supply at relatively high frequencies, such as between —50-150 kilohertz, to reduce the size of the associated magnetic components such as the power transformer. At these relatively high frequencies pulse width modulating systems have several disadvantages. Electromagnetic interference radiation is increased. Efficiency is reduced due to the increased switching losses. Both of these undesirable aspects result from the large number of harmonics generated by a square wave output. Additionally, in flyback converter types of switching regulators, a relatively large peak reverse voltage stress is applied to the secondary winding output rectifiers. Such peak reverse voltage stress is undesirable for switching power supplies operating a high frequencies and providing high current from low voltage secondary supplies. Such switching power supplies use Schottky output rectifiers which cannot sustain large peak reverse voltage stresses.

To avoid the disadvantages of pulse width modulators at high operating frequencies, sinewave resonant power converters have been used. In such converters, the power transformer includes relatively tightly coupled primary and secondary windings. A discrete inductor is placed in series with the primary winding and a resonating capacitor is coupled across the secondary winding. The resonating capacitor tunes essentially with the discrete inductor to form a tuned circuit that produces a generally sinewave output voltage across the secondary winding. The amplitude of the output voltage is determined by the operating frequency of the voltage generator coupled to the primary winding and discrete inductor. To provide regulation, the amplitude of the output voltage is sensed and fed back to the voltage generator to vary the generator's operating frequency.

A feature of the invention is a frequency controlled resonant regulator that incorporates into the power transformer the inductive portion of the regulator tuned circuit. A first winding of a power transformer is coupled to a source of unregulated voltage and to output switching means. A controllable source of switching signals is coupled to the output switching means for operating the switching means at a controllable frequency to generate a first alternating output voltage across a second winding of the power transformer. The power transformer incorporates substantial leakage inductance between the two windings. A resonating capacitance is coupled to the second winding for forming a tuned circuit with the inductance of the transformer. The amplitude of the output voltage is varied by varying the operating frequency of the switching means. A sense signal is coupled to the controllable source for developing a control signal that varies the output frequency to provide regulation of the output voltage.

In accordance with an aspect of the invention, the inductance of the tuned circuit is obtained primarily or exclusively from the leakage inductance of the power transformer. No other inductance, such as a discrete inductor, provides any significant inductance to the tuning of the resonant circuit. Because such an arrangement eliminates the need for a discrete inductor, the power transformer construction is simplified, since tight coupling of primary and secondary windings is not required, resulting in substantial economies.

The output voltage verses frequency characteristic of the tuned circuit is a function of operating frequency. The output voltage of the tuned circuit is greatly reduced at operating frequencies that are much higher than the resonant frequency of the tuned circuit. In carrying out the invention, the output voltage verses frequency characteristic of the tuned circuit may be advantageously used to provide standby or auxiliary voltages that are available even when the main regulated output voltages have been removed. Because the inventive resonant regulator incorporates a high leakage transformer, an auxiliary winding may be provided that is tightly coupled to the primary winding but loosely coupled to the regulated secondary winding that is being tuned by the resonanting capacitor. To place the power supply in standby mode of operation, the operating frequency of the voltage generator is increased to a value that places the operating point of the tuned circuit well above resonance. The sinewave output voltage is effectively reduced to insignificant value. However, because the auxiliary winding is tightly coupled to the primary winding the square wave auxiliary voltage that this winding supplies is largely unaffected by the increase in operating frequency. This auxiliary voltage may then be used as a source of standby voltage.

FIG. 1 illustrates a frequency controlled resonant regulator, embodying the invention;

FIG. 5 illustrates in exploded perspective view a pot core that may be advantageously used in the power transformers of FIGS. 1 and 4;

FIG. 6 illustrates a side elevation view of a pot core transformer including windings that may be advantageously used as the power transformers of FIGS. 1 and 4; and FIG. 7 illustrates a cross-sectional view of the transformer of FIG. 6 view through the cross-sectional lines 7—7.

Figure 2:
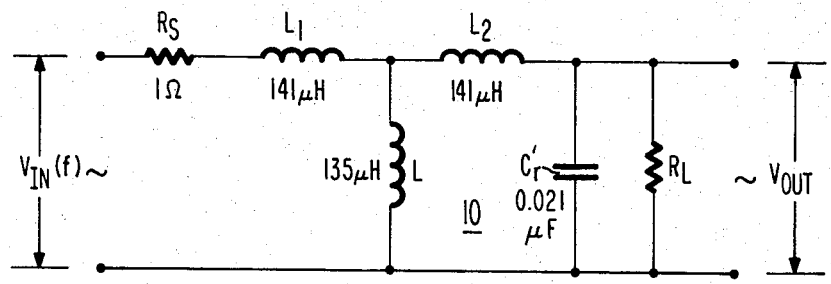
FIG. 2 illustrates the electrical equivalent circuit of the resonant power transformer of FIG. 1.

The circuit of FIG. 1 for drawing clarity is separated into Part A and Part B, with transformer T4 and capacitor $C_r$ being shown in both parts.

A resonant regulator 20, embodying the invention, illustrated in FIG. 1, includes a high leakage transformer T4 having a primary winding W1 coupled to an output switching stage 30 that includes an upper switching device S1 comprising an output switching field effect transistor Q6, paralleled by an oppositely poled diode D5, and that includes a lower switching device S2 comprising an output switching field effect transistor Q7, paralleled by an oppositely poled diode D6. An unregulated DC voltage source 70 is coupled to primary winding W1 and output switching transistors Q6 and Q7.

Unregulated voltage source 70 comprises a source of alternating current, mains supply voltage 21 coupled between input terminals 23 and 24 and a full wave bridge rectifier 27 via an on-off switch 22 and a current limiting resistor R1. An unregulated direct voltage is developed between output terminal 25 of bridge rectifier 27 and a current return terminal 26 designated as an earth ground 40, not conductively isolated from mains source 21. Filtering of the unregulated direct voltage is provided by the series coupled capacitors C5 and C6 coupled between bridge output terminal 25 and earth ground 40.

Bridge output terminal 25 is coupled to upper switching device S1 and lower switching device S2 is coupled to earth ground terminal 40. The upper terminal of primary winding W1 of transformer T4 is coupled to terminal 28, the junction of capacitors C5 and C6 and the lower terminal of winding W1 is coupled through a DC blocking capacitor C10 to switch output terminal 31, at the junction of switches S1 and S2.

The connection of primary winding W1 to the junction of capacitor C5 and C6 enables positive and negative supply voltages $+V_{in}$ and $-V_{in}$ to be alternately applied across the winding during alternate conduction of switches S1 and S2. By providing both polarity input voltages, $\pm V_{in}$, a single primary winding, without center tap, may be used, reducing the reverse voltage stresses on semiconductor switches S1 and S2.

The development of voltages of both polarities by means of bridge rectifier 27 and capacitors C5 and C6 enables resonant regulator 20 to be connected to two different AC main voltage levels. For example, when the AC mains voltage is 220 VAC, then the full wave bridge rectifier arrangement described previously is provided. When the AC mains supply voltage is at a lower voltage level of 120 VAC, then a jumper wire 29 is used to connect terminal 28 directly to AC mains source 21 at bridge input terminal 24. When jumper wire 29 is in use, the rectifier diodes form a half-bridge, voltage doubler, to the develop substantially the same dual polarity voltages, $\pm V_{in}$, across respective capacitors C5 and C6 as are developed when a 220 VAC mains voltage source is connected to bridge rectifier 27.

To control the frequency of operation of output switches S1 and S2 of controllable output switching stage 30, a voltage controlled oscillator 50 generates a high frequency, 50% duty cycle switching signals 32 illustratively at a nominal frequency $f=f_o=64$ kilohertz. Switching signal 32 is coupled to the bases of opposite conductivity signal transistors Q1 and Q2, to alternately switch conduction between the two transistors. The alternate switching of transistors Q1 and Q2 produces square wave voltages across windings $w_1$ and $w_2$ of a coupling transformer T2. The square wave voltages across windings $w_1$ and $w_2$ are 180 degrees out of phase with each other, when each voltage is referenced relative to the respective undotted terminals of their windings. The square wave voltages across windings $w_1$ and $w_2$ are transformer coupled to windings $w_3$ and $w_4$ of transformer T2 to produce the alternate switching into conduction of turnoff transistors Q4 and Q5. The collector electrodes of transistors Q4 and Q5 are coupled to the respective gate electrodes of output switching transistors Q6 and Q7.

During the controlled switching of output switches S1 and S2 by the switching signals 32 generated in VCO 50, the alternate turnoff of output switching transistors Q6 and Q7 is provided by the alternate conduction of transistors Q4 and Q5. Assume for example the top output switch S1 is conducting. The regulated voltage $V_{in}$ developed across capacitor C5 is applied by switch S1 to primary winding W1 of power transformer T4, with the lower, dotted terminal of the winding being the positive terminal. Forward gate drive voltage for output switching transistor Q6 is supplied from winding $W_b$ of a driver transformer T3 that has a primary winding $W_a$ coupled to a feedback winding W3 of power transformer T4.

To turn off switch S1, the square wave voltage across winding $w_3$ of transformer T2 turns on transistor Q4 and the oppositely phased square wave voltage across winding $w_4$ turns off transistor Q5. With transistor Q4 conducting, forward gate voltage for output switching transistor Q6 is removed, turning off transistor Q6.

With transistor Q6 cut off, an opposite polarity voltage is induced across primary winding W1 of transformer T4 making the upper, undotted terminals of primary winding W1 and feedback winding W3 of transformer T4 positive. With a reversal in polarity across winding W1 of transformer T4, diode D6 of switch S2 becomes conductive, taking up current in winding $W_1$. The voltage $-V_{in}$ developed across capacitor C6 is applied to primary winding W1 of transformer T4. The reversal in polarity across winding W3 of transformer T4 is coupled via winding $W_a$ of transformer T3 to make the upper, undotted terminal of secondary winding $W_c$ of transformer T3 positive, providing forward drive for output switching transistor Q7. Later in the interval, when current in winding W1 reverses in direction, conduction of the current transfers from diode D6 to transistor Q7.

In this manner, voltage controlled oscillator 50, in combination with output switching stage 30, comprise a voltage generator 80 that develops a 50% duty cycle square wave input voltage that is applied to primary winding W1 of resonant power transformer T4. The frequency of operation of voltage generator 80 is controlled by the operating frequency f of voltage controlled oscillator 50.

Power transformer T4 is constructed as a high leakage inductance transformer with the primary side windings W1–W3 being relatively tightly coupled to one another and with the secondary side windings W4–W7 also being tightly coupled to one another but loosely coupled to the primary side windings. The operation of output switching stage 30 generates a square wave alternating polarity voltage across primary winding W1 to develop alternating polarity voltages across primary side windings W2 and W3 and secondary side windings W4–W7.

The secondary side windings provide rectified and filtered DC supply voltages $+V_0$, $+V_1$, $+V_2$ and $-V_3$, that are referenced to a chassis ground 60 that is conductively isolated from earth ground 40. When resonant regulator 20 is used as a power supply for a video display monitor or television receiver, the secondary side DC supply voltages provide power to such loads as the horizontal deflection and high voltage circuits, powered by the $+V_0$ DC supply, the vertical deflection circuit, powered by the $+V_1$ DC supply, and the small signal circuitry, powered by the $+V_2$ and $-V_3$ DC supplies.

To regulate the secondary side output voltages against loading changes and against changes in the unregulated voltage developed at bridge rectifier terminal 25, a resonanting or tuning capacitor $C_r$ is coupled across one of the secondary side windings, illustratively across secondary side winding W7. Resonanting capacitor $C_r$ forms a series tuned circuit 10 with the leakage inductance of power transformer T4 to produce generally sinusoidal alternating output voltages across all the tightly coupled secondary side windings. The amplitude of each of the alternating output voltages is established in accordance with the controllable frequency of operation of voltage generator 80.

FIG. 2 illustrates a simplified electrical equivalent circuit of high leakage inductance power transformer T4 referred to the primary side and of the resonanting capacitor reflected to the primary side as the capacitance $C'_r$. The inductance of transformer T4 may be represented as a T-network comprising series inductors $L_1$ and $L_2$, and a shunt inductor L coupled to the junction of inductors $L_1$ and $L_2$. When a source of alternating input voltage $V_{in}$ is applied to the electrical equivalent circuit of FIG. 2, an alternating output voltage $V_{out}$ is developed across capacitor $C'_r$ and across a load impedance $R_L$, where $R_L$ represents the equivalent load impedance, reflected to the primary side, of the load circuits coupled to the secondary side windings W4–W7. The impedance $R_s$ represents the source impedance of the voltage source $V_{in}$ and the winding resistances of transformer T4.

Assume for simplified explanatory purposes that the input voltage $V_{in}$ is a sinewave voltage of amplitude $V_i$ for producing a sinewave output voltage $V_{out}$ of a nominal amplitude $V_0$ across a resistive load impedance $R_L = R_{L0}$ for some nominal operating stage of the power supply.

Figure 3:
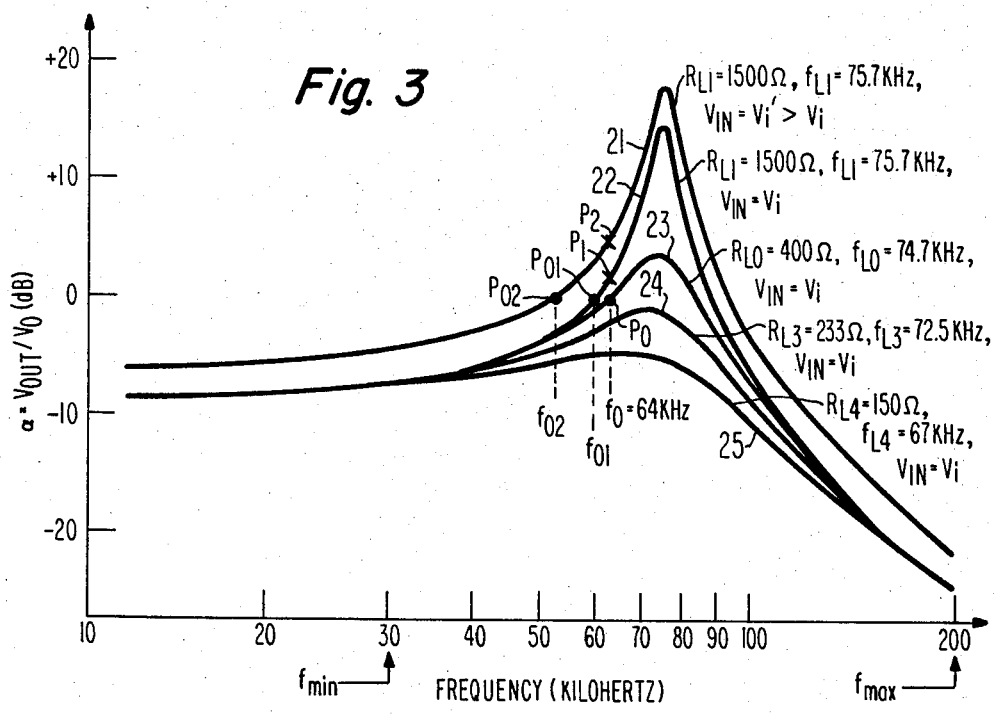
FIG. 3 illustrates a family of curves of output voltage verses frequency for the circuit of FIG. 2.

Resonating capacitor $C'_r$ forms a series tuned circuit with the T-network inductance (L, $L_1$ and $L_2$), of the electrical equivalent circuit of transformer T4 in FIG. 2. FIG. 3 illustrates the output voltage characteristic $\alpha = V_{out}/V_0$ in decibels as a function of operating frequency f, for the electrical equivalent circuit of transformer T4 in FIG. 2. As illustrated by the family of curves in FIG. 3, tuned circuit 10 of FIG. 2 has a resonant frequency $f_L$ that varies slightly as a function of loading, with the resonant frequency increasing as the loading decreases. For example, the resonant frequency $f_{L1}$, associated with a load resistance $R_{L1}$ is slightly greater than the resonant frequency $f_{L3}$ associated with a smaller load resistor $R_{L3}$.

The voltage gain $\alpha$, or equivalently, the amplitude of the output voltage $V_{out}$ depends on the operating characteristics of the transformer power supply electrical equivalent circuit of FIG. 2, including the operating frequency f of the voltage $V_{in}$. For the nominal operating characteristics of, for example, $V_{in} = V_i$ and $R_L = R_{L0}$, the output voltage $V_{out} = V_0$ at a nominal operating frequency of $f = f_0$. The transformer and tuned circuit operating point, given these characteristic values, is located at point $P_0$ of curve 23 in FIG. 3.

To regulate the amplitude of the output voltage $V_{out}$ against changes in the load $R_L$ and against changes in the amplitude of the input voltage $V_{in}$, the operating point of tuned circuit 10 is changed by varying the operating frequency f. For example, assume a decrease in loading from a load resistance $R_{L0}$ to $R_{L1}$. If the operating frequency remains unchanged at $f = f_0$, then the operating point of tuned circuit 10 of FIG. 2 changes from point $P_0$ of curve 23 in FIG. 3 to the operating point $P_1$ of curve 22, thereby producing an undesirable increase in output voltage amplitude. To maintain a constant output voltage amplitude when the loading decreases, the operating frequency is decreased from the frequency $f_0$ to the lower frequency $f_{01}$. The new operating point is moved to the point $P_{01}$ of curve 22, keeping the amplitude of the output voltage unchanged.

In a similar manner, the operating frequency f is varied when the input voltage $V_{in}$ changes in amplitude. Curve 21 of FIG. 3 illustrates the voltage gain $\alpha$ verses frequency f of the transformer power supply of FIG. 2 for a load $R_L = R_{L1}$ and for an input voltage $V_{in} = V'_i$ that is greater than the voltage $V_i$ associated with curve 22. Thus, to maintain a constant amplitude output voltage, the operating frequency of tuned circuit 10 is decreased from the frequency $f_{01}$ to the frequency $f_{02}$ to move the operating point from $P_{01}$ to the operating point $P_{02}$ having the same output voltage amplitude.

In resonant regulator 20 of FIG. 1 the operating point of the tuned circuit of transformer T4 is changed to maintain relatively constant secondary side DC supply voltages with changes in unregulated input voltage and with changes in loading by the secondary side load circuits. In FIG. 1, a sense voltage $V_f$ representative of the regulated DC output voltage $+V_0$, for example, is developed at the junction of voltage dividing resistor R34 and R35, of a regulator control circuit 55. The voltage $V_f$ is coupled to the inverting input terminal of a comparator U4B. The non-inverting input terminal of comparator U4B is grounded. To provide a reference potential for comparator U4B when the non-inverting input terminal is grounded, a negative bias voltage developed across zener diode Z3 is summed with the feedback voltage $V_f$ at the inverting input terminal of comparator U4B.

The error voltage output $V_e$ of comparator U4B is amplified by amplifier U4A, lowpass filtered by an RC network comprising resistor R22 and capacitor C18 and applied as a control voltage $V_c$ to control the operating frequency f of voltage controlled oscillator 50 and voltage generator 80. The biasing of comparator U4A is such that under nominal conditions, a zero error voltage $V_e$ produces an operating frequency $f_o$ for VCO 50.

As the DC output supply voltage $+V_0$ tends to decrease, for example, due to either increased loading or decreased unregulated input voltage, the control voltage $V_c$ increases, to increase the operating frequency f of VCO 50 and voltage generator 80. The operating point of tuned circuit 10 is moved to the right in the voltage gain verses frequency illustration of FIG. 3, to maintain a constant output voltage.

In accordance with a feature of the invention, resonant regulator 20 includes overload protection that is automatically provided by the frequency control circuitry of the regulator. Because resonant power transformer T4 is designed as a series resonant tuned circuit, the resonant output voltages decrease rapidly as the operating frequency f becomes significantly greater than the resonant frequency $f_L$ of the tuned circuit. Consider an overcurrent operating condition where, for example, picture tube arcing results in a short circuit to ground of the final anode electrode. Overload current is then drawn from the $+V_0$ DC supply terminal, causing the supply voltage $+V_0$ to decrease. For a decrease in output voltage $+V_0$, regulator control circuit 55 is designed to increase the frequency of operation f of VCO 50 moving the operating point of tuned circuit 10 to the right. However, under overload conditions the load resistance $R_L$ is substantially decreased resulting in the operating curve changing from a curve like curve 23 of FIG. 3 to a curve like curve 25, having decreased maximum output voltage amplitude, substantially below the amplitude of the output voltage $V_0$ at the nominal operating point $P_0$.

Because of this tuned circuit response characteristic of the voltage gain curve under an overload condition, regulator control circuit 55 drives the operating frequency f beyond the resonant frequency $f_{L4}$ of curve 25 in FIG. 3, in an attempt to overcome the decrease in output voltage $+V_0$. Once the operating frequency is driven above resonance, the output voltage decreases rapidly as a function of increasing frequency f above the resonance point. Regulator control circuit 55 continues to drive the operating frequency higher until the maximum frequency $f_{max}$ is reached. At this point, the extreme range of frequency operation of resonant control circuit 55 is reached and the operating frequency of voltage generator 80 is kept at their frequency. One notes that at the overload operating frequency $f_{max}$ the output voltage $V_{out}$ is substantially below its nominal voltage $V_0$, decreasing by over 20 decibels in the illustration of FIG. 3.

The frequency limit $f_{max}$, for overload operation is established by diodes D12 and D18 of FIG. 1 that are coupled between inverting input terminal 7 and output terminal 10 of comparator U4B. When the feedback voltage $V_f$ decreases substantially under overload conditions, the diodes D12 and D18 become forward biased to clamp the error voltage $V_e$ of comparator U4B to the voltage at the inverting terminal 7. This prevents the error voltage $V_e$ and the operating frequency f from increasing by any further significant amount.

The automatic, high frequency overload type of operation that resonant regulator 20 assumes is advantageously produced by designing the regulator so that the operating point of tuned circuit 10 under normal voltage and load conditions is at a point below resonance in the family of operating curves of FIG. 3. By designing the operating points to be below resonance, under normal operation, regulator control circuit 55 must drive the operating frequency to the right, to higher frequencies for increased loading. Thus, when an overload conditions occurs, the operating frequency is driven to the right beyond the resonance frequency, and by means of a positive feedback type of effect, continues to be driven to the right until the overload limit frequency $f_{max}$ is reached.

Additionally, a diode D13 is provided that limits the lowest frequency of operation $f_{min}$ to which regulator control circuit 55 is capable of driving VCO 50. Diode D13 is poled in a direction opposite to diodes D12 and D18, with the anode of diode D13 coupled to inverting input terminal 7 of comparator U4B and the cathode of the diode coupled to output terminal 10. If during start-up or during a fault operating condition the voltage at inverting terminal 7 of comparator U4B increases greatly, the error voltage $V_e$ at output terminal 10 of comparator U4B decreases sufficiently to forward bias diode D13. When diode D13 conducts, no further significant decrease in error voltage $V_e$ and operating frequency f can occur. The minimum operating frequency $f_{min}$ is selected so as to keep currents in output switches S1 and S2 and in primary winding W1 of transformer T4 to safe levels.

In accordance with another feature of the invention, by providing the resonant inductance for tuned circuit 10 primarily or exclusively as the inductance in a high leakage transformer, auxiliary windings, tightly coupled to primary winding W1, such as auxiliary winding W2, are capable of developing output voltages even when no significant voltages are being developed by the secondary side windings W4–W7. Provided that voltage generator 80 is operating to produce a square wave voltage across primary winding W1, an auxiliary square wave voltage is also developed across winding W2 having a frequency that is determined by the frequency of operation of generator 80. The amplitude of the auxiliary secondary winding voltage is not significantly affected by the frequency of operation of generator 80, nor by the operating point of tuned circuit 10. The amplitude of the auxiliary supply voltage is however unregulated and varies with changes in the amplitude of the unregulated voltage developed at bridge rectifier terminal 25.

The square wave voltage across auxiliary winding W2 is recitifed by a diode D9, filtered by a capacitor C11, and regulated by a zener diode Z1 to generate a regulated, positive auxiliary supply voltage $+V_{ss}$. In a similar manner, a regulated negative auxiliary supply voltage $-V_{ss}$ is developed from the auxiliary square wave voltage developed across winding W2 by means of rectification by a diode D10, filtering by a capacitor C12, and regulated by a zener diode Z2.

As mentioned previously, the auxiliary supply voltages $\pm V_{ss}$ are developed even when no secondary side output voltages, such as output voltage $+V_0$ are developed. Thus, under overload conditions, when the operating frequency of voltage generator 80 is driven to its upper limit $f_{max}$, auxiliary supply voltages $\pm V_{ss}$ are available to supply the voltage requirements of the generator. The $+V_{ss}$ suppy provides voltage to VCO 50, comparator U4B, amplifier U4A, and signal switching transistors Q1 and Q2. The $-V_{ss}$ supply provides the bias voltage for zener diode Z3 needed for biasing inverting input terminal 7 of comparator U4B.

In accordance with another inventive feature, a start-up circuit 90 is provided for resonant regulator 20 to insure reliable and safe start-up of the power supply from the time on-off switch 22 is closed until steady-state operating conditions have been achieved. When on-off switch 22 is first closed, voltage begins to be developed at bridge rectifier terminal 25. Secondary side supply voltages and the auxiliary voltages $\pm V_{ss}$ are absent. VCO 50 is not yet operative to generate switching signal 32 for output switching stage 30.

To initiate the switching of output switching stage 30, a small amount of current is supplied from bridge rectifier terminal 25 to the gate of, for example, output switching transistor Q6 via a resistor R10. Transistor Q6 turns on to apply voltage to the dotted terminal of primary winding W1 of transformer T4. Feedback winding W3 provides positive feedback to the gate of transistor Q6 via windings $W_a$ and $W_b$ of saturating transformr T3 to make transistor Q6 fully conductive.

The positive feedback provided by winding W3 to the gate of transistor Q6 via winding $W_b$ and to the gate of transistor Q7 via winding $W_c$ enables output switching stage 30 to form a free running oscillator, free running at a relatively low frequency of, for example, 16 to 20 kilohertz. Switching of conduction between switch S1 and switch S2 occurs when the volt-seconds buildup in the core of saturating transformer T3, produced by the voltage applied to winding $W_a$ by feedback winding W3, saturates the core of transformer T3. Forward gate voltage to the conducting output switching transistor Q6 or Q7, as appropriate, is removed. A reversal in polarity across primary winding W1 and feedback winding W3 of transformer T4 is produced to apply forward gate voltage to the other one of the switching transistors, Q6 or Q7.

During this first phase of start-up, when output switching stage 30 is free running at a relatively low frequency, auxiliary supply voltages $\pm V_{ss}$ are developed because of the tight coupling of auxiliary winding W2 to primary winding W1 of transformer T4. However, at the low, free running frequency that output switching stage 30 is operating, the secondary side output supply voltages are greatly reduced and are ineffective to power their respective load circuits. In contrast, regulator control circuit 55 and VCO 50 derive their supply voltages from auxiliary winding W2 and begin to operate during the first, free running phase of the start-up interval.

To avoid undesirable transient variations in the switching frequency of switching signal 32 as the supply voltages $\pm V_{ss}$ are formed, a signal blocking transistor Q8 is made conductive and shunts the output of VCO 50 to ground, away from signal switching transistors Q1 and Q2. Output switching stage 30 continues to free run until stable auxiliary supply voltages $\pm V_{ss}$ and a stable free running frequency for VCO 50 are established.

To shunt the output of VCO 50 to ground, Q8 is made conductive by receiving base current from the $+V_{ss}$ auxiliary supply terminal via an RC network comprising a resistor R39 coupled between the base terminal of transistor Q8 and chassis ground a resistor R38 and a capacitor C30 coupled in series between the $+V_{ss}$ supply terminal and the base of Q8. The time constant associated with resistor R38 and R39 and capacitor C30 establishes the duration of conduction of blocking transistor Q8. The duration is sufficiently long to provide for a stable free running frequency switching signal 32. The emitter of transistor Q8 instead of being grounded directly is grounded via diodes D20–D22 to provide further control of the durtion of transistor conduction.

After stable operation of VCO 50 has been achieved, a second phase of start up is entered when blocking transistor Q8 becomes cutoff to enable switching signal 32 to synchronize operation of output switching stage 30. In the second phase of start-up, output switching stage 30 is switched at the nominal free running frequency $f_0$ of, illustratively 64 kilohertz.

Secondary side output voltages of increasing amplitude begin to develop acrossed secondary side windings W4–W7 of resonant transformer T4. Heavy load currents are initially drawn from the secondary side windings to charge the various load circuit filter capacitances. This initial heavy loading excites tuned circuit 10 of transformer T4 into producing transient oscillations of the output supply voltages, including the $+V_0$ voltage.

To prevent regulator control circuit 55 from erroneously varying the frequency of VCO 50 in response to these transient oscillations, error voltage $V_e$ produced by comparator U4B is prevented from reaching amplifier U4A blocking transistor Q3. Transistor Q3 is made conductive during the startup interval as soon as the $+V_{ss}$ supply terminal is capable of providing it with sufficient base current via a capacitor C29 and a resistor R36. When transistor Q3 is conductive, output terminal 10 of comparator U4B is coupled to ground and ground potential is applied to the noninverting input terminal of amplifier U4A. When noninverting input terminal of amplifier U4A is at ground potential, the control voltage $V_c$ is established at a value that permits VCO 50 to operate at its nominal frequency $f_0$ despite the occurrence of initial, transient oscillations of the DC supply voltage $+V_0$.

Transistor Q3 remains conductive for a duration sufficiently long to permit the transient oscillations of the secondary side supply voltages to stop and to permit steady-state operating conditions to prevail. After the elapse of the second phase of the start-up interval, after transition to steady-state operating conditions has been achieved, blocking transistor Q3 becomes cutoff enabling the normal error voltage $V_e$ to be applied to amplifier U4A to control the frequency of VCO 50 in a normal feedback manner. The duration of conduction of transistor Q3 is determined by the time constant associated with a capacitor C29 and resistors R36 and R37. The time constant is selected to maintain transistor Q3 conductive longer than transistor Q8 and until steady-state operating conditions have been achieved.

Figure 4:
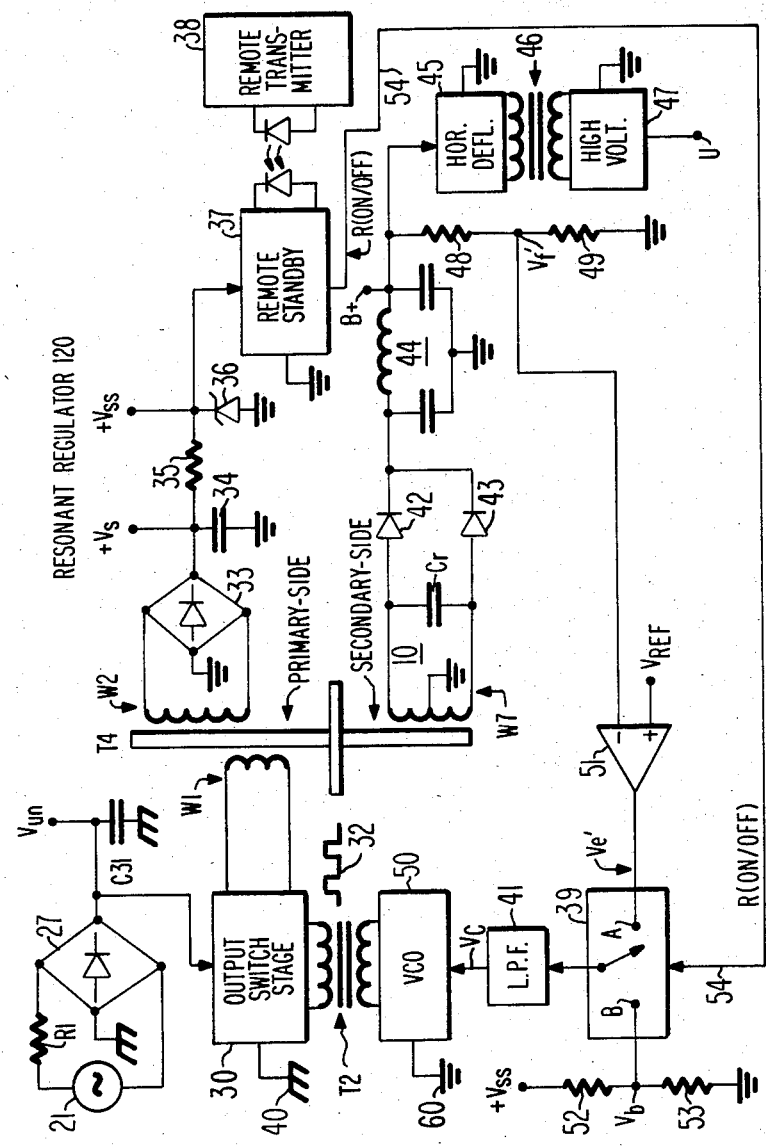
FIG. 4 illustrates another frequency controlled resonant regulator, embodying the invention, used as the power supply for a remote responsive television receiver.

FIG. 4 illustrates a frequency controlled resonant regulator 120, embodying the invention, that provides standby mode and run mode power to a remote controlled television receiver. Items in FIGS. 1 and 4 similarly identified function in a similar manner or represent similar quantities.

In FIG. 4 the AC voltage from mains voltage source 21 is full wave recitified by a bridge rectifier 27 to develop an unregulated DC voltage $V_{un}$ filtered by a capacitor C31. The unregulated voltage is applied to output switching stage 30 of resonant regulator 120 to produce an unregulated, 50% duty cycle, square wave voltage across primary winding W1 of resonant power transformer T4. A regulated secondary side alternating output voltage is developed across winding W7 in accordance with the operating point established for tuned circuit 10 that includes resonating $C_r$ an the inductance of high leakage transfomer T4.

The regulated voltage across winding W7 is full wave rectified by diodes 42 and 43 and filtered by an LC filter network 44 to develop a regulated DC voltage at a B+ terminal. The B+ voltage is applied to a horizontal deflection circuit 45 to generate scanning current in the horizontal deflection winding of the television receiver, not illustrated in FIG. 4. The B+ terminal also supplies power to a high voltage circuit 47, via horizontal deflection circuit 45 and a flyback transformer 46. High voltage circuit 47 provides ultor voltage at a terminal U for the picture tube of the television receiver, not illustrated in FIG. 4. Additional secondary side supply windings, not illustrated in FIG. 4, provide low voltage supplies to other television receiver circuits such as the vertical, audio, and small signal circuits.

To regulate the secondary side supply voltages, a feedback voltage $V'_f$ is developed from the B+ voltage by voltage dividing resistors 48 and 49. Feedback voltage $V'_f$ is applied to the inverting input terminal of a comparator 51 to generate a error voltage $V'_e$ that is applied to a contact terminal A of a mode switch 39.

In the run-mode, or full power mode, of television receiver operation, the on-state of an on/off command signal R is developed on a signal line 54 coupled to mode switch 39. During the on-state of command signal R, the arm of mode switch 39 make contact with terminal A to enable the error voltage $V'_e$ to be passed on to lowpass filter 41. Lowpass filter 41 generates a control voltage $V_c$ for VCO 50 that varies in accordance with the error voltage $V'_e$.

VCO 50 generates a switching signal 32 at a frequency that is controlled by feedback voltage $V'_f$. Switching signal 32 is transformer coupled via an isolation signal transformer T2 to synchronize the switching of output switching stage 30 at the frequency of switching signal 32. Regulation of the secondary side output voltages is achieved by varying the frequency of switching signal 32 in accordance with the feedback voltage $V'_f$.

The signal state of command signal R is controlled by the output of a conventional remote standby circuit 37. When a user wishes to turn on the television receiver and provide full power to the receiver circuits, the user operates a conventional remote transmitter 38 that sends, for example, an infrared signal that is decoded by standby circuit 37 to switch the state of command signal R to the on-state. When the user wishes to turn off the television receiver and place the receiver in the standby mode of operation, differently coded infrared signal is received by standby circuit 37 and switches the state of command signal R to the off-state.

In accordance with an inventive feature, when the off-state of command signal R is developed on signal line 54, the arm of mode switch 39 is moved to make contact with terminal B, decoupling error voltage $V'_e$ from lowpass filter 41. A bias voltage $V_b$ is developed at mode switch terminal B by voltage dividing resistors 52 and 53 coupled between the $+V_{ss}$ auxiliary supply terminal and chassis ground. The value of bias voltage $V_b$ is selected to produce, when coupled by mode switch 39 to lowpass filter 41, a control voltage $V_c$ that operates VCO 50 at its upper limit high frequency operation of $f=f_{max}$ of FIG. 3.

With resonant regulator 120 being operated during standby at the frequency $f_{max}$, the operating point of tuned circuit 10 is well above resonance, resulting in the loss of secondary side output voltages, such as the B voltage. All the television receiver load circuits powered by the secondary side voltages become inoperative, placing the television receiver in a standby, low power state.

In accordance with another feature of the invention, resonant power transformer T4 provides the required supply voltage to standby circuit 37 in the standby or off-state of the television receiver. Even though the transformer is being operated at a very high frequency during standby, alternating voltages are being developed by auxiliary winding W2 that is tightly coupled to primary winding W1.

The auxiliary output voltage across winding W2 is full wave rectified by a bridge rectifier 33 and filtered by a capacitor 34 to provide an auxiliary DC voltage $+V_s$ that is unregulated with changes in the mains derived voltage $V_{un}$. Auxiliary voltage $V_s$ coupled to a zener diode 36 via a resistor 35 to produce the regulated auxiliary DC voltage $+V_{ss}$ that is developed not only during on-state operation of the television receiver but also during standby operation. Auxiliary supply voltage $+V_{ss}$ is therefore suitable for use by remote standby circuit 37 as a voltage supply that is available during standby mode of operation as well as during run-mode of operation or in other words, that is available during both states of remote on/off command signal R.

In accordance with another inventive aspect, high leakage power transformer T4 may be constructed as a cup core or pot core transformer. Because of the closed core configuration of a pot core, radio frequency interference radiation from the high leakage transformer is kept relatively low. This results in a further reduction in radiation beyond the reduction provided due to the sinewave rather than square wave nature of the output voltages developed by the secondary side windings.

FIG. 5 illustrates an exploded perspective view of the pot core of power transformer T4. The transformer core comprises two ferrite pot core elements, a pot core element PCP having a center post leg 62p around which the primary side windings W1–W3 of FIG. 1, for example, are wound, and a pot core element PCS having a center leg post 62s, not illustrated in the perspective view of FIG. 5, around which the secondary side windings W4–W7 are wound.

In addition to the center leg post 62p or 62s, each of the pot core elements includes a cylindrical wall or skirt 61 surrounding the center leg post and a solid end wall 64. Each of the pot core elements is provided with gap 63 in cylindrical wall 61 to enable the lead wires of the various primary and secondary side windings to be brought out of the pot core for their connection to the appropriate circuit elements in regulator 20 of FIG. 1.

FIG. 6 illustrates pot core transformer T4 in the assembled state including the primary side windings, generally designated as windings P, and the secondary side windings, generally designated as windings S. Also illustrated in FIG. 6 are representative lead wires 65 that are brought out of the transformer core through gap 63. Not illustrated in FIG. 6 are the conventional fastening hardware necessary to secure the transformer in its assembled configuration and necessary to secure the transformer to a circuit board or chassis.

FIG. 7 illustrates in cross-sectional view the assembled transformer T4 through the cross-sectional line 7—7 of FIG. 6. In the cross-sectional view of FIG. 7, one notes that an air gap G is provided between primary core leg 62p and secondary core leg 62s. An alternative way of providing a gap G, not illustrated in the figures, is to use two identical pot core elements PCP and PCS assembled together but separated from each other by an insulating and non-magnetizable spacer having a thickness equal to the desired gap length.

Air gap G produces the required loose coupling between the primary side windings P and the secondary side windings S, that provides the tuning leakage inductance of resonant circuit 10 of FIGS. 1 and 4. The loose coupling permits the secondary side winding voltages to be of sinusodial waveform and the primary side winding voltages to be of square wave waveform.

The following is an illustration of a construction for a inventive embodiment of resonant power transformer T4 of FIG. 1.

Core: Two each, ferrite pot core, manufactured by Ferroxcube Corp. Saugerties, N.Y., Series 4229, Part Number 4229P-LOO-3C8, modified by extending cylindrical wall 61 of each by 0.2 inch and by extending the center leg post 62s by 0.2 inch, resulting in a gap G of 0.2 inch being developed when the transformer core is assembled.

Primary Winding W1: 45 turns of litz wire of 400 circular mills total cross section, with the litz wire formed by 25 strands of 0.004 inch diameter enameled copper wire.

Auxiliary Winding W2: nine turns of litz wire of 200 circular mills total cross-section, with the litz wire formed by 20 strands of 0.0035 inch diameter enameled copper wire.

Feedback Winding W3: ten turns of litz wire of 200 circular mills total cross-section, with the litz wire formed by 20 strands of 0.0035 inch diameter copper wire.

Secondary winding W7: 36 turns, center tapped, of litz wire of 1500 circular mills total cross section, with the litz wire formed by 60 strands of 0.005 inch diameter enameled copper wire.

Secondary Winding W6: two turns of litz wire of 600 circular mills total cross-section, with the litz wire formed by 25 strands of 0.005 inch diameter enameled copper wire.

Secondary Winding W5: three turns of litz wire of 600 circular mills total cross-section, with the litz wire formed by 25 strands of 0.005 inch diameter enameled copper wire.

Secondary Winding W4: eight turns of litz wire of 600 circular mills total cross-section, with the litz wire formed by 25 strands of 0.005 inch diameter enameled copper wire.

Given the above transformer specifications, the following is obtained:

L (primary) = 276 microhenry.
L (secondary) = 196 microhenry.
M (mutual coupling) = 114 microhenry.
k (coefficient of coupling) = 0.49.

Additional values for an arrangement illustrated in FIG. 1 are as follows:

$C_r$ = 0.03 microfarad, polypropylene.
$f_0$ = 64 kilohertz, nominal operating frequency.
$V_{in}$ = ±150 volts DC.
Input Power = 140 watts.
Q = 5, for tuned circuit 10 at 140 watts load power, to provide extremely high efficiency of around 90%.

What is claimed is:

1. A frequency controlled resonant regulator comprising:
    a source of unregulated voltage;
    a power transformer having a first winding coupled to said source;
    output switching means coupled to said first winding;
    a controllable source of switching signals coupled to said output switching means for operating said switching means at a controllable frequency to generate a first alternating output voltage across a second winding of said power transformer to power a first load circuit, said transformer incorporating high leakage inductance between said first and second windings;
    a resonanting capacitance coupled to said second winding for forming a tuned circuit with the leakage inductance of said transformer to establish the amplitude of said output voltage in accordance with said controllable frequency;
    means coupled to said controllable source and responsive to a sense signal for developing a control signal that varies said controllable frequency in accordance with said sense signal to regulate said first altnerating output voltage;
    a third winding of said transformer tightly coupled with said first winding and loosely coupled with said second winding for generating a second alternating output voltage having an amplitude that is generally unaffected by substantial changes in the operating point of said tuned circuit; and
    a DC power supply responsive to said second alternating output voltage for generating a DC voltage having an amplitude that is generally unaffected by substantial changes in the operating point of said tuned circuit and that is available for powering a second load circuit when said operating point is outside the normal regulation range.

2. A regulator according to claim 1 wherein said second load circuit comprises a controllable oscillator within said controllable source for generating said switching signals in accordance with the frequency of said oscillator and wherein during an overload condition, said controllable oscillator is operated at a frequency that places the operating point of said tuned circuit outside the normal regulation range to substantially reduce the amplitude of said first alternating output voltage, said DC voltage powering said controllable oscillator during said overload condition.

3. A regulator according to claim 2 wherein the core of said transformer comprises two pot core sections, said first winding being located on the center leg post of said first core section and said second winding being located on the center leg post of said second core section.

4. A regulator according to claim 1 wherein said DC voltage energizes a standby circuit, said standby circuit developing an on-off command signal that is coupled to said controllable source of switching signals such that, during the off-state of said command signal, the frequency of said switching signals places the operating point of said tuned circuit outside said normal regulation range to place said load circuit in a standby condition.

5. A regulator according to claim 1, wherein during normal operation of said regulator, said controllable source of switching signals varies said controllable frequency in a range of frequencies that maintains the operating point of said tuned circuit below resonance.

6. A regulator according to claim 5 wherein during an overload condition, said controllable source of switching signals produces switching signals having a controllable frequency that places the operating point of said tuned circuit substantially above resonance to substantially reduce the amplitude of said first alternating output voltage.

7. A frequency controlled resonant regulator comprising:
    a source of unregulated voltage;
    a power transformer having a first winding coupled to said source;
    output switching means coupled to said first winding;
    a controllable source of switching signals coupled to said output switching means for operating said switching means at a controllable frequency to generate a first alternating output voltage across a second winding of said power transformer;
    an inductance associated with said power transformer;
    a resonating capacitance coupled to said power transformer and forming a tuned circuit with said inductance to establish the amplitude of said output voltage in accordance with said controllable frequency;
    means coupled to said controllable source in a negative feedback loop circuit and responsive to a sense signal for developing a control signal that varies said controllable frequency in accordance with said sense signal to regulate said output voltage; and means for disabling said negative feedback loop circuit during a start-up interval to provide open-loop operation of said regulator during said interval.

8. A regulator according to claim 7 wherein said controllable source includes a controllable oscillator and means for establishing an operating point for said tuned circuit during said start-up interval at a nominal preselected frequency.

9. A regulator according to claim 8 wherein said nominal preselected frequency is a frequency within the normal range of operating frequencies of said regulator.

* * * * *